(12) United States Patent
Troy et al.

(10) Patent No.: US 11,238,675 B2
(45) Date of Patent: Feb. 1, 2022

(54) MOBILE VISUAL-INSPECTION SYSTEM

(71) Applicant: The Boeing Company, Chicago, IL (US)

(72) Inventors: James J. Troy, Issaquah, WA (US); Scott W. Lea, Renton, WA (US); Daniel J. Wright, Mercer Island, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 108 days.

(21) Appl. No.: 15/945,640

(22) Filed: Apr. 4, 2018

(65) Prior Publication Data

US 2019/0311555 A1    Oct. 10, 2019

(51) Int. Cl.
| | |
|---|---|
| *H04N 5/232* | (2006.01) |
| *G07C 5/08* | (2006.01) |
| *B64F 5/60* | (2017.01) |
| *G06T 7/73* | (2017.01) |
| *G06F 17/16* | (2006.01) |
| *G06K 9/00* | (2006.01) |

(52) U.S. Cl.
CPC .............. *G07C 5/0808* (2013.01); *B64F 5/60* (2017.01); *G06F 17/16* (2013.01); *G06K 9/00624* (2013.01); *G06T 7/73* (2017.01); *H04N 5/23296* (2013.01); *G06T 2207/30244* (2013.01)

(58) Field of Classification Search
CPC ....... B64F 5/60; G06F 17/16; G06K 9/00624; G06T 2207/30244; G06T 7/73; G07C 5/0808; H04N 5/23296

USPC ......................................................... 348/142
See application file for complete search history.

(56) References Cited

U.S. PATENT DOCUMENTS

| | | | |
|---|---|---|---|
| 7,194,358 B2 | 3/2007 | Callaghan et al. | |
| 8,713,998 B2 | 5/2014 | Troy et al. | |
| 2005/0185945 A1* | 8/2005 | Zhang | H04N 7/181 396/73 |
| 2009/0086014 A1* | 4/2009 | Lea | G01S 5/163 348/25 |

(Continued)

FOREIGN PATENT DOCUMENTS

| | | |
|---|---|---|
| EP | 2851681 | 3/2015 |
| EP | 2952890 | 12/2015 |

(Continued)

OTHER PUBLICATIONS

Oriental Motor Website, Method for calculating moment loads on linear actuators, Jun. 30, 2017.*

(Continued)

*Primary Examiner* — James T Boylan
(74) *Attorney, Agent, or Firm* — Kunzler Bean & Adamson

(57) ABSTRACT

A ground-based visual-inspection system includes a ground-based visual-inspection apparatus and a control system. The ground-based visual-inspection apparatus includes a mobile base, an actuatable arm coupled to the mobile base, and an effector coupled to the actuatable arm. The actuatable arm is locatable in a three dimensional space. The end effector includes a camera configured to capture images of a structure, such as an aircraft. The control system is configured to determine location information of the camera relative to a reference location and associate the location information with the images.

20 Claims, 6 Drawing Sheets

(56) References Cited

U.S. PATENT DOCUMENTS

| | | | |
|---|---|---|---|
| 2010/0152899 A1* | 6/2010 | Chang | B25J 9/162 |
| | | | 700/262 |
| 2012/0249741 A1* | 10/2012 | Maciocci | G06F 3/011 |
| | | | 348/46 |
| 2012/0320372 A1* | 12/2012 | Troy | G01N 29/043 |
| | | | 356/237.2 |
| 2013/0188059 A1* | 7/2013 | Georgeson | G01B 11/24 |
| | | | 348/169 |
| 2015/0116481 A1* | 4/2015 | Troy | G01N 21/88 |
| | | | 348/128 |
| 2016/0050852 A1* | 2/2016 | Lee | B25J 5/007 |
| | | | 47/1.44 |
| 2016/0171776 A1* | 6/2016 | Bridges | G01B 11/005 |
| | | | 348/47 |
| 2017/0052070 A1* | 2/2017 | Marsh | G01N 25/72 |
| 2018/0154521 A1* | 6/2018 | Bosscher | B25J 9/1664 |
| 2018/0361571 A1 | 12/2018 | Georgeson et al. | |
| 2018/0361595 A1 | 12/2018 | Troy et al. | |
| 2019/0094149 A1 | 3/2019 | Troy et al. | |
| 2019/0098221 A1 | 3/2019 | Troy et al. | |
| 2019/0242971 A1* | 8/2019 | Troy | G01S 5/0284 |
| 2019/0256226 A1 | 8/2019 | Shapoury et al. | |

FOREIGN PATENT DOCUMENTS

| | | |
|---|---|---|
| EP | 3173338 | 5/2017 |
| KR | 100849106 | 7/2008 |
| WO | 2012050803 | 4/2012 |

OTHER PUBLICATIONS

U.S. Appl. No. 15/898,724, filed Feb. 19, 2018.
U.S. Appl. No. 15/714,662, filed Sep. 25, 2017.
U.S. Appl. No. 15/833,094, filed Dec. 6, 2017.
U.S. Appl. No. 15/623,304, filed Jun. 16, 2017.
U.S. Appl. No. 15/878,642, filed Jan. 24, 2018.
Extended European Search Report for EP Patent Application No. 19165608.1 dated Jul. 23, 2019.
Examination Report for EP Patent Application No. 19165608.1 dated Feb. 1, 2021.

* cited by examiner

MOBILE VISUAL-INSPECTION SYSTEM

FIELD

This disclosure relates generally to visual-inspection systems, and more particularly to ground-based mobile visual-inspection systems for inspecting large structures, such as aircraft.

BACKGROUND

Aircraft and other mobile vehicles sometimes require inspection for wear. One type of inspection is visual-inspection. For large vehicles, visual-inspection can be difficult to accomplish. For many hard to reach areas, drones or other unmanned aerial vehicles are used to fly cameras close to the aircraft. However, drones have vibrating parts and may be adversely affected by weather conditions, such as wind or precipitation. To prevent the drones from impacting the aircraft, the drones are flown a safe distance from the aircraft, which results in less than ideal photographs and video of the aircraft.

SUMMARY

The subject matter of the present application has been developed in response to the present state of the art, and in particular, in response to the problems and disadvantages associated with conventional fixtures that have not yet been fully solved by currently available techniques. Accordingly, the subject matter of the present application has been developed to provide embodiments of a system, an apparatus, and a method that overcome at least some of the above-discussed shortcomings of prior art techniques. For example, according to one implementation, ground-based mobile visual-inspection system is disclosed, which facilitates the capture of steady and precisely-located photos and videos.

Disclosed herein is a ground-based visual-inspection system including a ground-based visual-inspection apparatus and a control system. The ground-based visual-inspection apparatus includes a mobile base, an actuatable arm coupled to the mobile base, and an effector coupled to the actuatable arm. The actuatable arm is locatable in a three dimensional space. The end effector includes a camera configured to capture images of a structure. The control system is configured to determine location information of the camera relative to a reference location and associate the location information with the images. The preceding subject matter of this paragraph characterizes example 1 of the present disclosure.

The control system is configured to determine the location information by determining a location of the camera relative to the reference location by acquiring a base location by computing a transformation matrix of the mobile base relative to the reference location, acquiring an arm location by computing a transformation matrix of the actuatable arm relative to the reference location, and performing matrix multiplication of the transformation matrix of the mobile base and the transformation matrix of the actuatable arm to compute a transformation matrix of the end effector relative to the reference location. The preceding subject matter of this paragraph characterizes example 2 of the present disclosure, wherein example 2 also includes the subject matter according to example 1, above.

The control system further includes an alignment system including a plurality of laser rangefinders coupled to the end effector. The preceding subject matter of this paragraph characterizes example 3 of the present disclosure, wherein example 3 also includes the subject matter according to any one of examples 1-2, above.

The alignment system is configured to determine an orientation of the camera relative to the structure based on data of the plurality of laser rangefinders. The preceding subject matter of this paragraph characterizes example 4 of the present disclosure, wherein example 4 also includes the subject matter according to example 3, above.

The control system is further configured to embed orientation information of the camera in the images. The preceding subject matter of this paragraph characterizes example 5 of the present disclosure, wherein example 5 also includes the subject matter according to any one of examples 1-4, above.

The alignment system is configured to determine a distance of the camera relative to the structure based on data of the plurality of laser rangefinders. The preceding subject matter of this paragraph characterizes example 6 of the present disclosure, wherein example 6 also includes the subject matter according to any one of examples 3-5, above.

The control system is further configured to embed distance information in the images. The preceding subject matter of this paragraph characterizes example 7 of the present disclosure, wherein example 7 also includes the subject matter according to any one of examples 1-6, above.

The control system is configured to embed the location information into the image. The preceding subject matter of this paragraph characterizes example 8 of the present disclosure, wherein example 8 also includes the subject matter according to any one of examples 1-7, above.

The location information is based on data from sensors on the ground-based visual-inspection apparatus. The preceding subject matter of this paragraph characterizes example 9 of the present disclosure, wherein example 9 also includes the subject matter according to any one of examples 1-8, above.

The location information is based on a reference position on the structure. The preceding subject matter of this paragraph characterizes example 10 of the present disclosure, wherein example 10 also includes the subject matter according to any one of examples 1-9, above.

The mobile base is a cart maneuverable by manual power. The preceding subject matter of this paragraph characterizes example 11 of the present disclosure, wherein example 11 also includes the subject matter according to any one of examples 1-10, above.

The system further includes an alignment system including a plurality of laser rangefinders coupled to the end effector, wherein the alignment system is configured to determine an orientation and a distance of the camera relative to the structure based on data of the plurality of laser rangefinders, wherein the control system is further configured to embed orientation information and distance information with the images. The control system is configured to embed the location information into the image. The preceding subject matter of this paragraph characterizes example 12 of the present disclosure, wherein example 12 also includes the subject matter according to any one of examples 1-11, above.

The location information includes a translational displacement from a reference position and rotational displacement from a reference orientation of the mobile base relative to the reference location. The preceding subject matter of this paragraph characterizes example 13 of the present disclosure, wherein example 13 also includes the subject matter according to any one of examples 1-12, above.

The actuatable arm includes an indexing rail. The preceding subject matter of this paragraph characterizes example 14 of the present disclosure, wherein example 14 also includes the subject matter according to any one of examples 1-13, above.

Also disclosed herein is a ground-based visual-inspection apparatus. The ground-based visual-inspection apparatus includes a mobile base, an actuatable arm coupled to the mobile base, an effector coupled to the actuatable arm, and a control system. The actuatable arm is locatable in a three dimensional space. The end effector includes a camera configured to capture images of a structure. The control system is configured to determine location information of the camera relative to a reference location. The preceding subject matter of this paragraph characterizes example 15 of the present disclosure.

The ground-based visual-inspection apparatus further includes a plurality of laser rangefinders coupled to the end effector. The preceding subject matter of this paragraph characterizes example 16 of the present disclosure, wherein example 16 also includes the subject matter according to example 15, above.

Also disclosed herein is a method. The method includes aligning a ground-based visual-inspection apparatus to a structure, the ground-based visual-inspection apparatus comprising a mobile base, an actuatable arm coupled to the mobile base, and an end effector coupled to the actuatable arm, wherein the end effector includes a camera. The method also includes capturing an image of the structure with the camera and determining location information of the camera relative to a reference location by acquiring a base location, arm location, and end effector location relative to a reference location. The method also includes associating the location information with the image. The preceding subject matter of this paragraph characterizes example 17 of the present disclosure.

The method further includes receiving data from sensors and automatically adjusting the orientation or distance of the camera relative to the structure based on the received data. The preceding subject matter of this paragraph characterizes example 18 of the present disclosure, wherein example 18 also includes the subject matter according to example 17, above.

The method further includes acquiring the base location by computing a transformation matrix of the mobile base relative to the reference location, acquiring the arm location by computing a transformation matrix of the actuatable arm relative to the reference location, and performing matrix multiplication of the transformation matrix of the mobile base and the transformation matrix of the actuatable arm to compute a transformation matrix of the end effector relative to the reference location. The preceding subject matter of this paragraph characterizes example 19 of the present disclosure, wherein example 19 also includes the subject matter according to any one of examples 17-18, above.

The method further includes determining distance information and orientation information of the camera relative to the structure and associating the distance information and the orientation information with the image. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
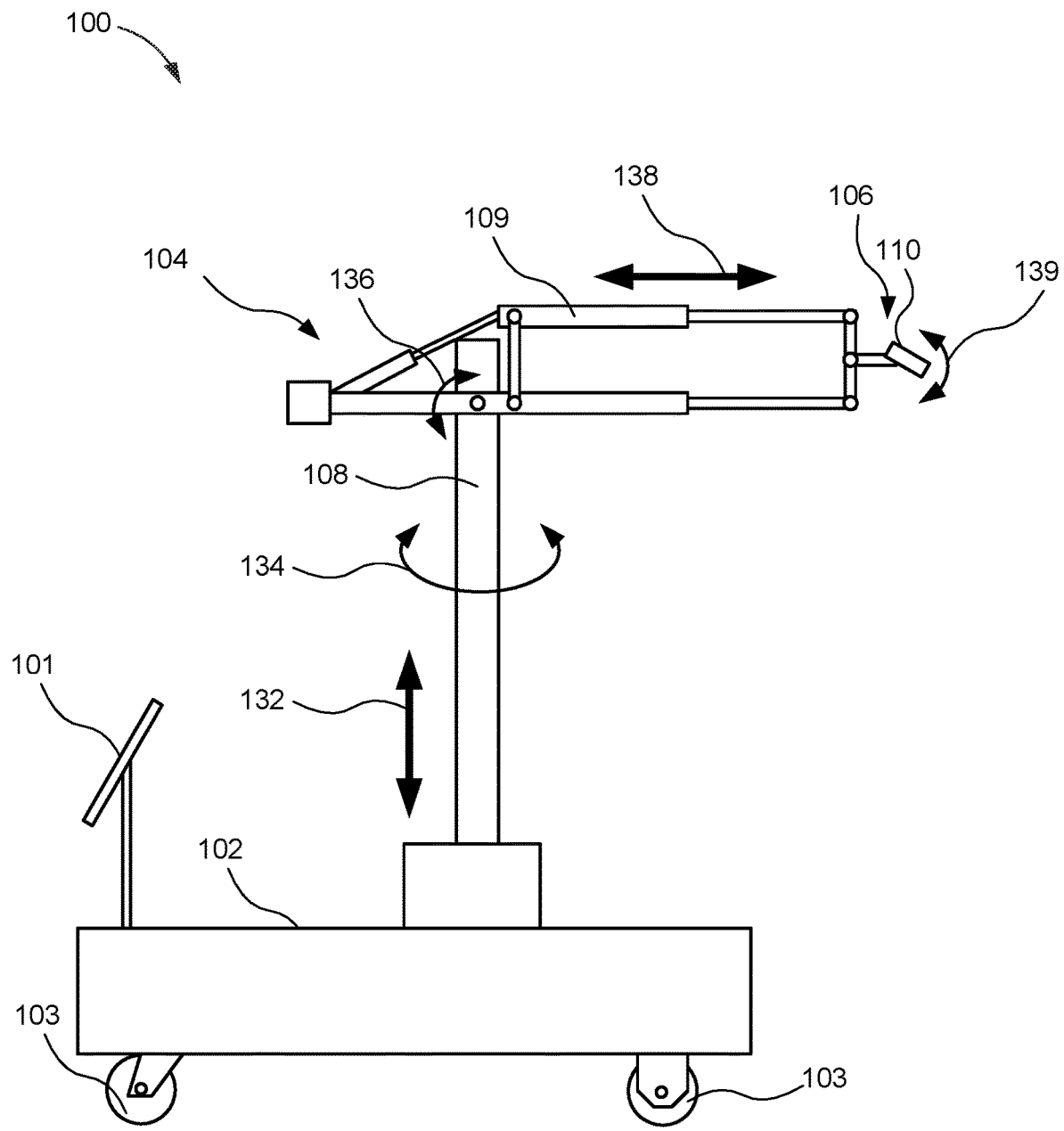
FIG. 1 is a side view of a ground-based visual-inspection apparatus, according to one or more embodiments of the present disclosure.
Figure 2:
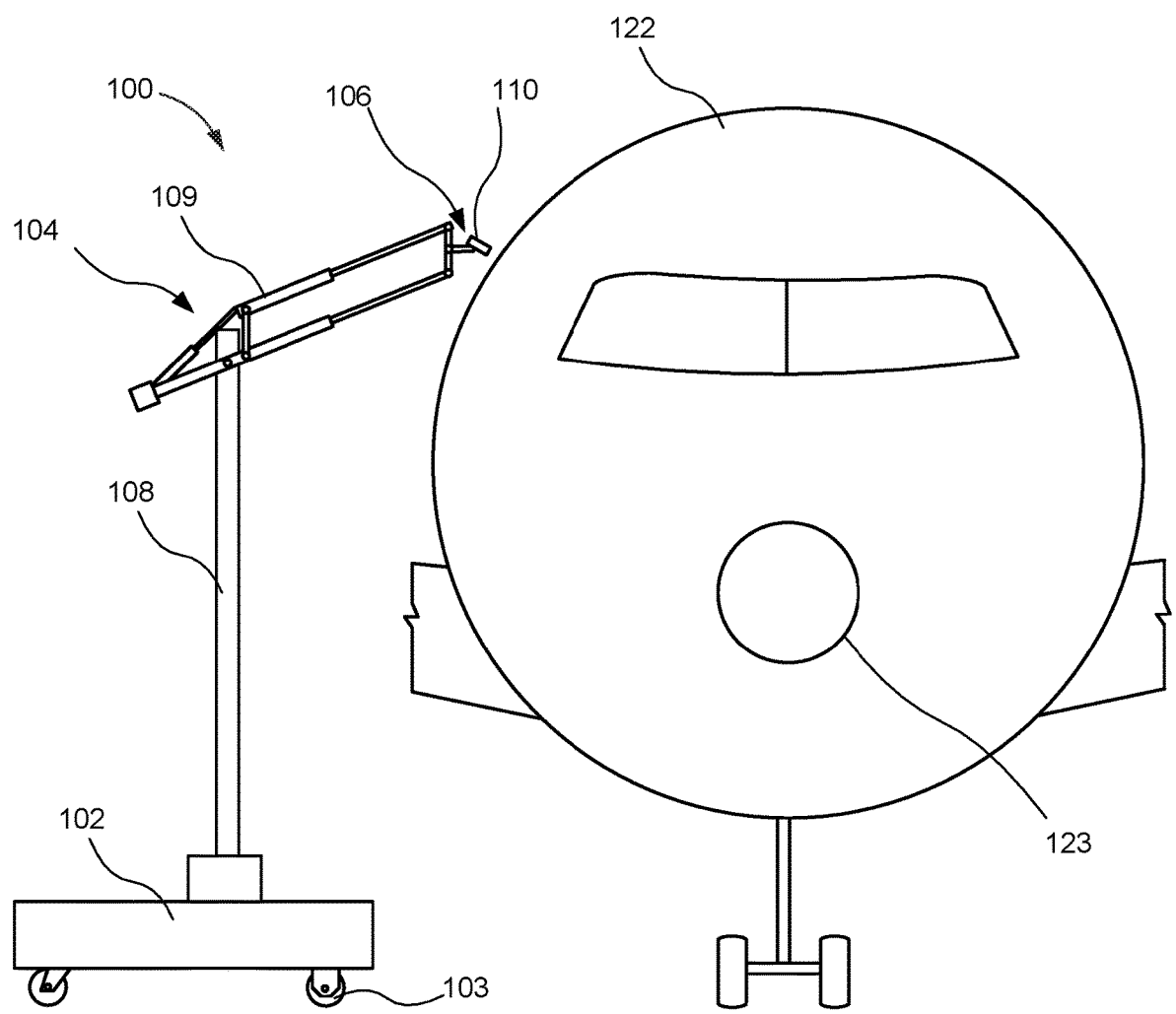
FIG. 2 is a side view of a ground-based visual-inspection apparatus in an inspecting position relative to an aircraft, according to one or more embodiments of the present disclosure.
Figure 4:
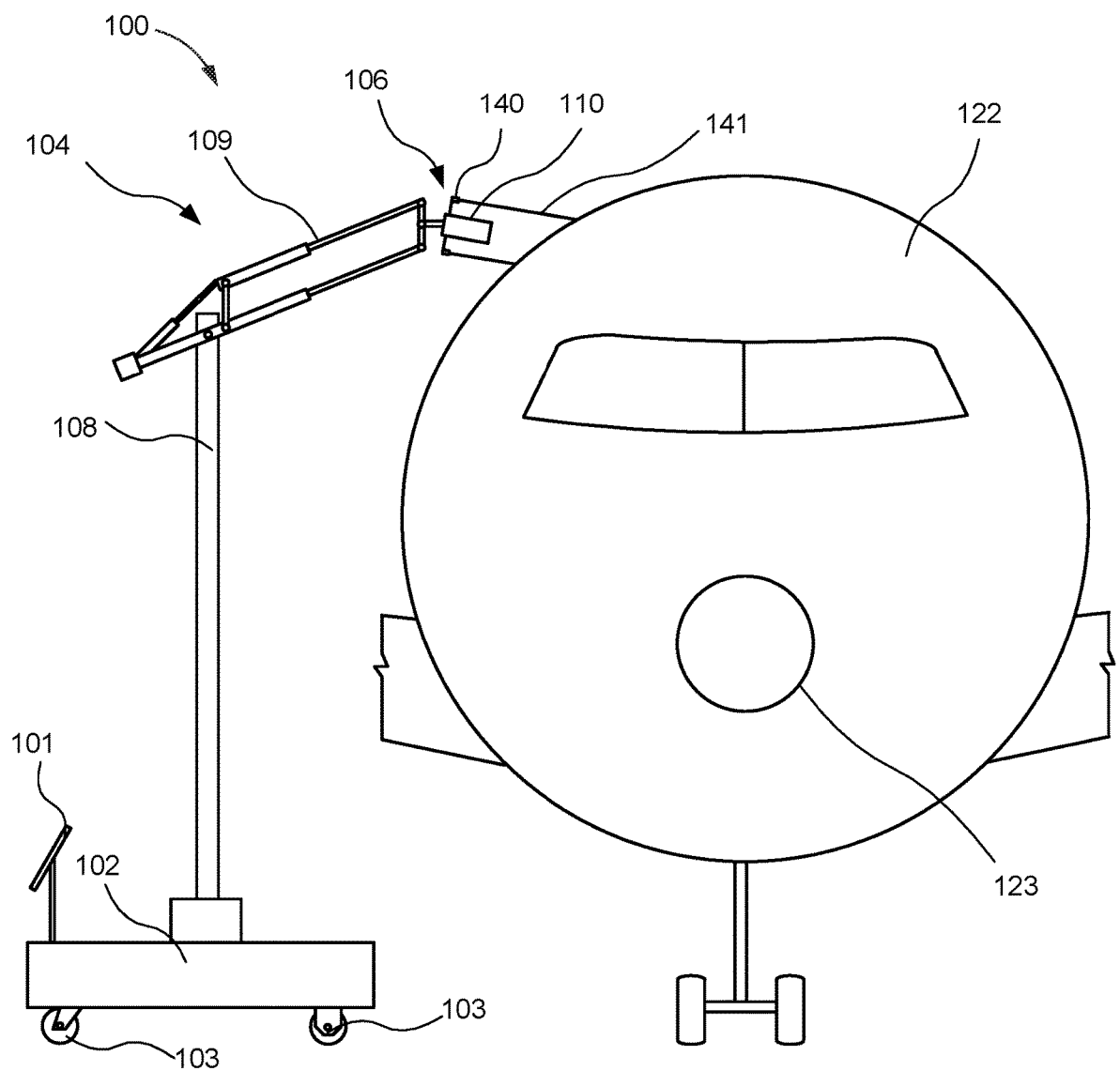
FIG. 4 is a side view of a ground-based visual-inspection apparatus inspecting an aircraft, according to one or more embodiments of the present disclosure.

Referring to FIG. 1, one embodiment of a ground-based visual-inspection apparatus 100 is shown. The ground-based visual-inspection apparatus 100 is used to visually inspect structures, such as vehicles (e.g., an aircraft 122 as shown in FIGS. 2 and 4), by capturing high-resolution images of the structures and associating the captured images with relevant information. As an example, aircraft are sometimes required to be visually inspected for wear. The size and shape of many aircraft make it difficult to visually inspect all necessary surface areas. One solution to the problem of visually inspecting difficult-to-reach areas is to utilize drones or unmanned aerial vehicles (UAVs) to fly close to the aircraft and capture images of the aircraft.

Captured images from UAVs are sometimes blurry, which may occur because of vibration of the UAV or because of weather conditions that make it difficult to maneuver the UAV. Landing the UAV on the aircraft may help alleviate such concerns. Unfortunately, however, UAVs can land on only some areas of the aircraft. Moreover flying a UAV close enough to an aircraft to land on the aircraft increases the risk of causing damage to the aircraft. For these and other reasons, a ground-based visual-inspection apparatus 100 and corresponding system are disclosed.

The ground-based visual-inspection apparatus 100 includes a mobile base 102. The mobile base 102 is a cart capable of maneuvering and supporting the remainder of the ground-based visual-inspection apparatus 100. In some embodiments, the mobile base 102 may be maneuvered under manual power. In other embodiments, the mobile base 102 may be maneuvered by motorized power. The mobile base 102 includes wheels 103 that allow holonomic motion, i.e., the mobile base 102 may be moved in any translational direction while simultaneously turning, thus allowing the mobile base 102 to be moved into any location near a structure to be inspected.

The ground-based visual-inspection apparatus 100 includes an actuatable arm 104. The actuatable arm 104 is a mechanical arm that is locatable in three dimensions. In the illustrated embodiment, the actuatable arm 104 includes a vertical actuator 108 and a horizontal actuator 109. Referring to FIG. 1 the vertical actuator 108 allows for movement in a vertical direction as shown by arrows 132. That is, the vertical actuator 108 is configured to actuate to any height within a predetermined range of heights. The range of heights, in some embodiments, would be any height that is greater than the height of the structure, allowing the actuatable arm 104 to position a camera 110 near any surface of the structure. The vertical actuator 108 may be any type of linear actuator, telescoping pole, a zippermast, an indexing rail, a hydraulic or pneumatic piston, electric motor, or other similar actuatable apparatus. In some embodiments, the system may be moved manually using human powered mechanisms, such as cables. Although any of various structures can be inspected by the apparatus 100, hereinafter, the features and functionality of the apparatus 100 will be described in association with the aircraft 122.

Similarly, the horizontal actuator 109 allows for movement in a horizontal direction as shown by arrows 138. That is, the horizontal actuator 109 is configured to actuate to any length within a predetermined range of lengths. The range of lengths, in some embodiments, would be any length that is greater than the half the width of the fuselage of the aircraft 122, allowing the actuatable arm 104 to position a camera 110 near any surface of the aircraft 122. The horizontal actuator 109 may be any type of linear actuator, telescoping pole, a zippermast, an indexing rail, a hydraulic or pneumatic piston, electric motor, or other similar actuatable apparatus.

With the movement of the mobile base 102 and the vertical and horizontal displacement of the vertical actuator 108 and the horizontal actuator 109, respectively, an end effector 106 coupled to the actuatable arm 104 is locatable in any three dimensional location. In addition to the movement described above, it is contemplated that the actuatable arm 104 may include further degrees of motion, such as, rotation of the vertical actuator 108 relative to the mobile base 102 (which is noted by arrows 134), rotation of the horizontal actuator 109 relative to the vertical actuator 108 (which is noted by arrows 136, and rotation of the end effector 106 relative to the horizontal actuator 109 (which is noted by arrows 139).

While the actuatable arm 104 is shown and described as a combination of linear actuators, the actuatabale arm 104 may comprise other configurations that allow for locating an end effector 106 in a three dimensional space, including but not limited to, a jib crane, telescoping crane, robotic arm, or a combination of linear and rotating actuators etc.

Coupled to the end of the actuatable arm 104 is the end effector 106. The end effector 106 is rotatable relative to the horizontal actuator 109 as shown by arrows 139. The rotation of the end effector 106 allows for the end effector 106 to be locatable (e.g., a positionable and orientatable) in a three dimensional space.

The end effector 106 includes a camera 110. The camera 110 may be configured to capture high-resolution video or still photography. As the end effector 106 is locatable in a three dimensional space, the position and orientation of the camera 110 is known. Such information can be associated with the captured images of the camera 110 allowing a person to know the location of the camera relative to the aircraft 122 and the orientation of the camera 110 relative to the aircraft 122.

As camera 110 is coupled to the mobile base 102 on the ground the camera 110 may capture high-resolution images with less vibration than cameras associated with UAVs. In addition, the camera 110 may be positioned close to the surface of the aircraft 122 without inadvertently bumping the surface of the aircraft 122, which also may occur with cameras associated with UAVs.

The ground-based visual-inspection apparatus 100 may further be associated with a control system 150. The control system 150 may be configured to allow for a user to control the movement of the mobile base 102, the actuatable arm 104, the end effector 106, and the camera 110. In some embodiments, the control system 150 is operated via a computer terminal 101. The computer terminal 101 may be configured to provide various measurements to the user including, but not limited to location of the mobile base 102, orientation of the mobile base 102, height of the vertical actuator 108, length of the horizontal actuator 109, orientation of the end effector 106. In other embodiments, the control system 150 remotely controls the ground-based visual-inspection apparatus 100.

The control system 150 is configured to associate location information 128 on a large structure, such as an aircraft 122, with images 126 captured of the structure. As described below, particular reference will be made to inspection of an aircraft 122. However, it is recognized that the apparatus 100 and control system 150 can be used to inspect any of various other large structures, such as vehicles, ships, rockets, etc. In some embodiments, the control system 150 is further configured to determine a location of the camera 110 relative to a reference location 125 on the aircraft 122. The location of the camera 110 may be determined by measuring the movement of the ground-based visual-inspection apparatus 100, for example, by optically measuring movement of the camera 110 relative to a reference location 125 (through, for example, simultaneous localization and mapping (SLAM)), or the other measurements described herein. The location information 128 may include a translational displacement of a mobile base 102 from a reference position and rotational displacement of the mobile base 102 from a reference location 125. A reference location 125 may include a reference position and/or a reference orientation of the ground-based visual-inspection apparatus 100.

Referring now to FIG. 2, the ground-based visual-inspection apparatus 100 is shown inspecting an aircraft 122. The ground-based visual-inspection apparatus 100 is capable of moving relative to the aircraft 122. The positioning of the ground-based visual-inspection apparatus 100 may be measured relative to a reference location 125 of the ground-based visual-inspection apparatus 100 (such as a starting location). For example, the ground-based visual-inspection apparatus 100 may be positioned and oriented at the nose 123 of the aircraft 122. As the ground-based visual-inspection apparatus 100 is moved, the measurements are relative to the reference location 125. That is, the displacement and orientation of the mobile base 102 is measured relative to the reference location 125. In addition, the vertical displacement of the vertical actuator 108 is measured as well as the displacement of the horizontal actuator 109 and the rotation of the horizontal actuator 109 relative to the vertical actuator 108. Furthermore, the orientation of the end effector 106 relative to the reference location 125 is measured. These measurements allow for the location of the captured image(s) to be known on the aircraft 122. With a close-up high-resolution image, the image itself likely has no visual reference points to indicate where on the aircraft 122 the image has been captured.

The reference location 125 may be in relation to the nose 123 of the aircraft 122. The reference location 125 may be in relation to any other identifiable location on the aircraft 122, such as a wing, window, engine, stabilizer, flap, landing gear, or other identifiable component or part of the aircraft 122.

The ground-based visual-inspection apparatus 100 may include various sensors or encoders that are configured to measure the movement of the components of the ground-based visual-inspection apparatus 100. For example, the mobile base 102 may include sensors that sense the displacement and rotation of the mobile base 102. In an implementation, the displacement and rotation of the mobile base 102 is measured by a differential odometry system that is configured to measure the movement of the wheels 103 (e.g., by odometry). In another implementation, movement of the mobile base 102 is measured by a global positioning system (GPS). In another implementation, encoders and sensors are used to measure movement of the mobile base 102. The ground-based visual-inspection apparatus 100 may use various components to measure movement including an incremental encoder, absolute encoder, rotary encoder, position sensor, proximity sensor, linear variable differential transformer, potentiometer, optical sensors, and other similar encoders or sensors.

The ground-based visual-inspection apparatus 100 may include various sensors or encoders that are configured to measure the movement of the actuatable arm 104. The sensors may be configured to measure the relative movement of the individual components of the actuatable arm 104, such as the vertical actuator 108 and the horizontal actuator 109. As an example, the vertical position of the vertical actuator 108 may be measured by an indexing rail or linear position sensors that sense the positioning of the vertical actuator 108. The actuatable arm 104 may use various components to measure movement including an incremental encoder, absolute encoder, rotary encoder, position sensor, proximity sensor, linear variable differential transformer, potentiometer, optical sensors, and other similar encoders or sensors.

Figure 3A:
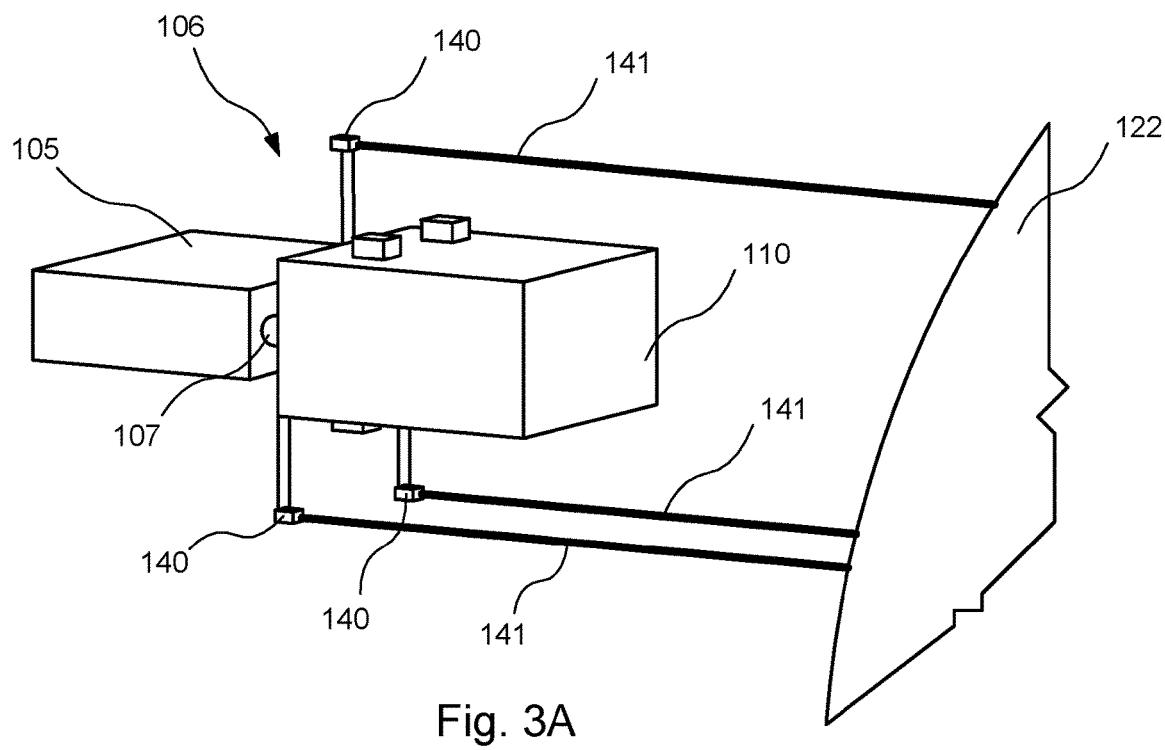
FIG. 3A is a perspective view of an end effector with a camera in a misaligned orientation, according to one or more embodiments of the present disclosure.
Figure 3B:
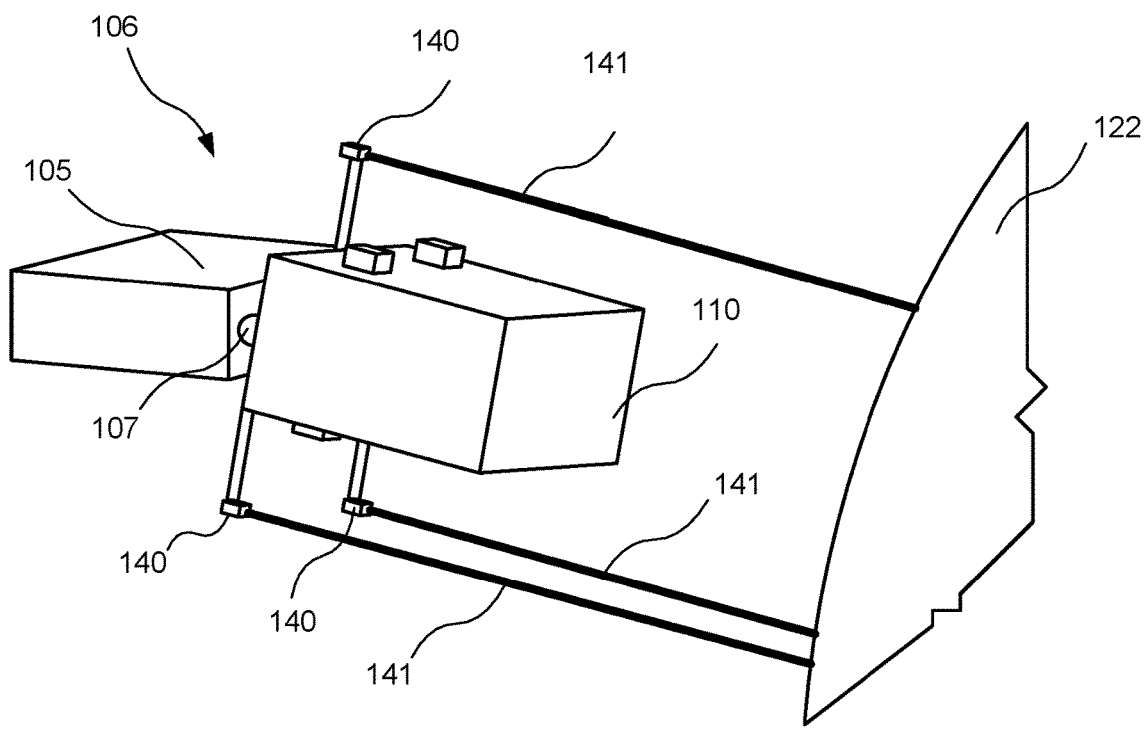
FIG. 3B is a perspective view of an end effector with a camera in an aligned orientation, according to one or more embodiments of the present disclosure.

Referring now to FIGS. 3A and 3B, an end effector 106 is shown. The end effector 106 includes a camera 110 coupled to a support element 105 by a pivot joint 107. The pivot joint 107 allows the camera 110 to move relative to the support element 105. In some embodiments, the camera 110 and the end effector 106 move relative to each other. That is, the camera 110 rotates relative to other parts of the end effector 106. In some embodiments, the camera 110 and the end effector 106 do not move relative to each other. That is, the rotation of the end effector 106 relative to the actuatable arm 104 rotates the camera 110.

The end effector 106 may further include an alignment system 170. The alignment system 170 includes a plurality of laser rangefinders 140. The laser rangefinders 140 are coupled to the camera 110. The laser rangefinders 140 are configured to use lasers 141 to measure the positioning of the camera 110 relative to the aircraft 122. In some embodiments, the laser rangefinders 140 are configured to measure the distance of the camera 110 from the aircraft 122. In some embodiments, the laser rangefinders 140 are configured to measure the orientation of the camera 110 relative to the aircraft 122. The alignment system 170 includes a plurality of laser rangefinders 140 which are positioned on opposite sides of the camera 110. The alignment system 170 may utilize two or more laser rangefinders 140. In some embodiment, the laser rangefinders 140 are disposed on opposite sides of the camera 110. In some embodiments, the laser rangefinders 140 are spaced around a perimeter of the camera 110. The number and spacing of the laser rangefinders 140 may be configured to allow the alignment system 170 to determine the orientation of the camera 110 relative to the aircraft 122.

The alignment system 170 may utilize different types of rangefinders including, but not limited to, optical, laser, radar, sonar, lidar, and ultrasonic proximity sensors.

In some embodiments, the alignment system 170 is configured to utilize a feedback system to automatically align the camera 110 to an orientation perpendicular to the surface of the aircraft 122 that is to be captured. In some embodiments, the alignment system 170 continuously adjusts the alignment of the camera 110 as the ground-based visual-inspection apparatus 100 moves relative to the aircraft 122. As the ground-based visual-inspection apparatus 100 moves along the target area of the aircraft 122, the alignment system 170 may automatically align the camera 110 by receiving data from the laser rangefinders 140 and controlling any actuators that may control movement of the ground-based visual-inspection apparatus 100 and its various components.

In some embodiments, the orientation of the camera 110 is manually controlled. Referring to FIG. 3A, the camera 110 is misaligned with the surface of the aircraft 122. The alignment system 170 rotates the camera 110 to automatically adjust the orientation of the camera 110 until the laser rangefinders 140 are lined up with the surface of the aircraft 122 as depicted in FIG. 3B, with the lasers 141 all sensing the surface of the aircraft 122 a same or similar distance from the camera 110.

Referring now to FIG. 4, a ground-based visual-inspection system 50 and an aircraft 122 are shown. The ground-based visual-inspection system 50 includes a ground-based visual-inspection apparatus 100 and an alignment system 170. The alignment system 170 includes laser rangefinders 140 which are utilizing lasers 141 to measure a distance to the aircraft 122. The lasers 141 of the laser rangefinders 140 are utilized to orient the camera 110 relative to the aircraft 122 by rotating the end effector 106 until the lasers 141 indicate equal distance to the aircraft 122.

In some embodiments, the laser rangefinders 140 are configured to function as proximity sensors. As proximity sensors, the laser rangefinders 140 may assist in automated motion control of the ground-based visual-inspection apparatus 100 to notify the ground-based visual-inspection apparatus 100 of proximity to the aircraft 122 and, in some embodiments, automatically activate/deactivate actuators. That is, data from the laser rangefinders 140 may be used to stop or activate the various actuators of the ground-based visual-inspection apparatus 100 and automatically deter potential collisions. Other types of collision preventions systems may be deployed which are configured to prevent collisions between the ground-based visual-inspection apparatus 100 and the aircraft 122. In some embodiments without automated control of the ground-based visual-inspection apparatus 100, the laser rangefinders 140 may activate indicator lights or a warning sound to warn a user of a potential collision between the ground-based visual-inspection apparatus 100 and the aircraft 122.

As discussed previously, the ground-based visual-inspection apparatus 100 may utilize a reference location 125 (starting location) and measure movement of the ground-based visual-inspection apparatus 100 relative to the reference location 125. In some embodiments, pre-acquired data of the aircraft 122 is utilized. In some embodiments, the pre-acquired data is retrieved from a computer aided design (CAD) model of the aircraft 122.

Figure 5:
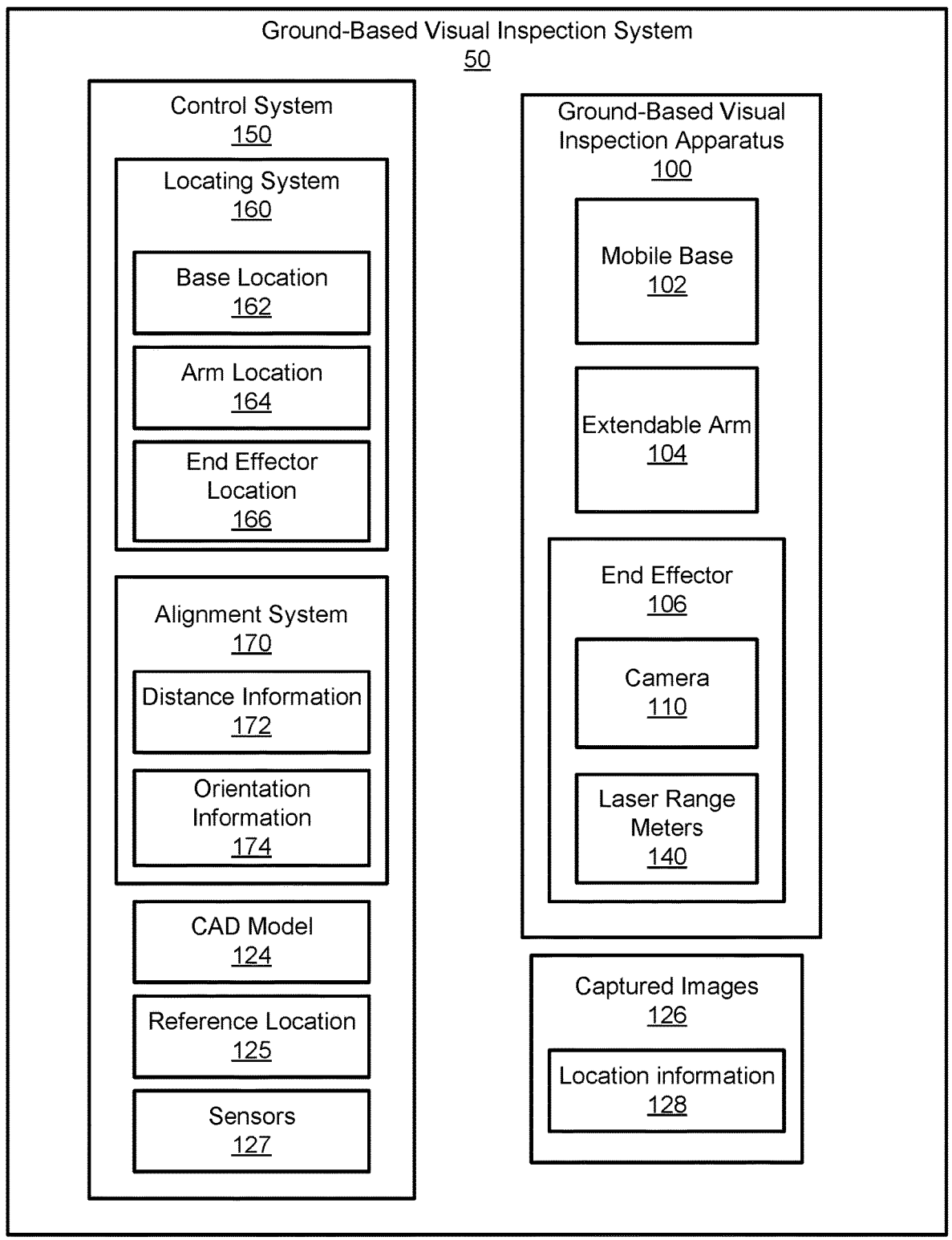
FIG. 5 is a block diagram of a ground-based visual-inspection system, according to one or more embodiments of the present disclosure.

Referring now to FIG. 5, a block diagram of a ground-based visual-inspection system 50 is shown. The ground-based visual-inspection system 50 is configured to capture visual images to aid in visually inspection of aircraft. The ground-based visual-inspection system 50 includes a ground-based visual-inspection apparatus 100 and a control system 150.

The ground-based visual-inspection system 50 includes a ground-based visual-inspection apparatus 100 may include some or all of the features described herein in conjunction with the remaining figures. The control system 150 includes a locating system 160 and an alignment system 170. The control system 150 is configured to control and regulate the movement of the ground-based visual-inspection apparatus 100.

The control system 150 may include various components, not illustrated, to allow for control of the components of the ground-based visual-inspection apparatus 100 described herein, such as, but not limited to, processors, memory, computer hardware and software, controllers, and modules. The control system 150 may be further configured to measure or receive inputs from sensors and encoders and adjust the ground-based visual-inspection apparatus 100 accordingly. In some embodiments, the control system 150 receives data from sensors 127 or laser rangefinders 140. The data from the sensors 127 or laser rangefinders 140 may be used as inputs to direct the ground-based visual-inspection apparatus 100 (and, more specifically, the individual actuators) to achieve alignment with the structure 122. In some embodiments, the data from sensors 127 or laser rangefinders 140 is used to automatically adjust the angle and/or the distance of the camera 110 relative to the surface of the structure 122.

The control system 150 includes, in some embodiments, a locating system 160. The locating system 160 is configured to control the positioning and orientation of the ground-based visual-inspection apparatus 100. In some embodiments, the locating system 160 is configured to continually adjust the position and orientation of the components of the ground-based visual-inspection apparatus 100 while the ground-based visual-inspection apparatus 100 is moved over the target area of the aircraft 122. The locating system 160 may be configured to activate actuators (such as vertical actuator 108 and horizontal actuator 109, and the rotational actuator (not shown) that rotates the end effector 106 about pivot joint 107) to adjust the position and orientation of the end effector 106 relative to the aircraft 122. As an example, as the ground-based visual-inspection apparatus 100 moves along the fuselage of the aircraft 122, the locating system 160 may determine the distance to the fuselage and automatically adjust the ground-based visual-inspection apparatus 100 to keep the camera 110 at a consistent distance from the fuselage and orientation relative to the surface. In some embodiments, the locating system 160 is configured to measure the movement of the ground-based visual-inspection apparatus 100. The locating system 160 may be configured to measure the absolute movement of the ground-based visual-inspection apparatus 100 or the relative movement of the ground-based visual-inspection apparatus 100 relative to a reference location 125.

In some embodiments, the locating system 160 is configured to control the positioning and orientation and measure the movement of the mobile base 102 and determine a base location 162. The base location 162 may be an absolute location or a relative location relative to a starting location or reference location 125.

In some embodiments, the locating system 160 is configured to control the positioning and orientation and measure the movement of the actuatable arm 104 and determine an arm location 164. The arm location 164 may be an absolute location or a location relative to a starting location or reference location 125.

In some embodiments, the locating system 160 is configured to control the positioning and orientation and measure the movement of the end effector 106 and determine an end effector location 166. The end effector location 166 may be an absolute location or a location relative to a starting location or reference location 125.

The control system 150 includes, in some embodiments, an alignment system 170. The alignment system 170 is configured to control the alignment of the end effector 106 and camera 110. In some embodiments, the alignment system 170 is configured to measure the movement and location of the end effector 106 and camera 110 relative to the aircraft 122. The alignment system 170 can be configured in a manner similar to or the same as that of the alignment system described in more detail in U.S. patent application Ser. No. 15/623,304, filed Jun. 14, 2017.

In some embodiments, the alignment system 170 is configured to measure and record a distance information 172 of the camera 110 or end effector 106 relative to the aircraft 122. Such distance information 172 may be associated with captured images 126 of the aircraft 122. In some embodiments, the alignment system 170 is configured to measure and record orientation information 174 of the camera 110 or end effector 106 relative to the aircraft 122. Such orientation information 174 may be associated with the captured images 126 of the aircraft 122.

The distance information 172 and the orientation information 174 may be associated or linked to the captured images 126 or may be embedded into the captured images as location information 128. Location information 128 may be metadata embedded into the captured images 126 may include any information measured or noted by the control system 150 including, but not limited to, positioning information of the ground-based visual-inspection apparatus 100, location information of the captured image 126 on the aircraft (based on a reference location 125 or a CAD model), the distance information 172, or the orientation information 174. The information associated with the captured images 126 assist a user in evaluating the captured images 126 more accurately.

In some embodiments, the location information 128 is the current location (i.e. position and orientation) of the camera 110 (or end effector 106) defined in a local coordinate system of the structure 122. The local coordinate system of the structure 122 may be determined by a CAD model or other similar information of the structure 122. In some embodiments, an association between the captured images 126 and the current location (i.e. position and orientation) of the camera 110 (or end effector 106) is determined. In some embodiments, the location of the camera 110, obtained from the location of the base 102 relative to the reference location 125, relative to the reference location 125 in the local coordinate system is combined with the kinematic movement of the actuatable arm 104 relative to the base 102.

In some embodiments, the control system 150 acquires a base location 162 from either odometry and/or GPS. For example, a transformation matrix of the mobile base 102 relative to an origin or reference location 125 may be acquired. In some embodiments, the location of the end effector 106 or camera 110 is determined by encoder data and the geometry of the actuatable arm 104. As another example, a transformation matrix of the actuatable arm 104 relative to an origin or reference location 125 may be computed to determine the arm location 164. In some embodiments, matrix multiplication of the two transformation matrices is performed to compute the transformation matrix of the end effector 106 (and, by extension, the camera 110) relative to the origin of the local coordinate system to compute the end effector location 166. In some embodiments, the control system 150 may then associate the location information 128 of the camera 110 relative to the origin of the local coordinate system of the target object with the current captured image 126. In some embodiments, this could mean embedding the location information 128 into the image 126 (for example, by using Exchangeable Image File Format (EXIF) for image metadata).

In some embodiments, the control system 150 includes sensors 127. The sensors 127 may be part of the ground-based visual-inspection apparatus 100. In some embodiments, some or all of the sensors 127 may be off-board sensors. As an example, the sensors may be on the aircraft 122 or on the ground, or both. The sensors 127 may be configured to provide data to the control system 150. The data may include distance and orientation information of the ground-based visual-inspection apparatus 100 relative to the aircraft 122. The data may, in some embodiments, be used to control the movement of the ground-based visual-inspection apparatus 100. That is, the motion of the ground-based visual-inspection apparatus 100 may be based of the data of the sensors 127. In embodiments that include off-board sensors, the control system 150 or ground-based visual-inspection apparatus 100 may be configured to communicate with the off-board sensors. In some embodiments, the control system 150 may be configured to wirelessly communicate with the off-board sensors.

Figure 6:
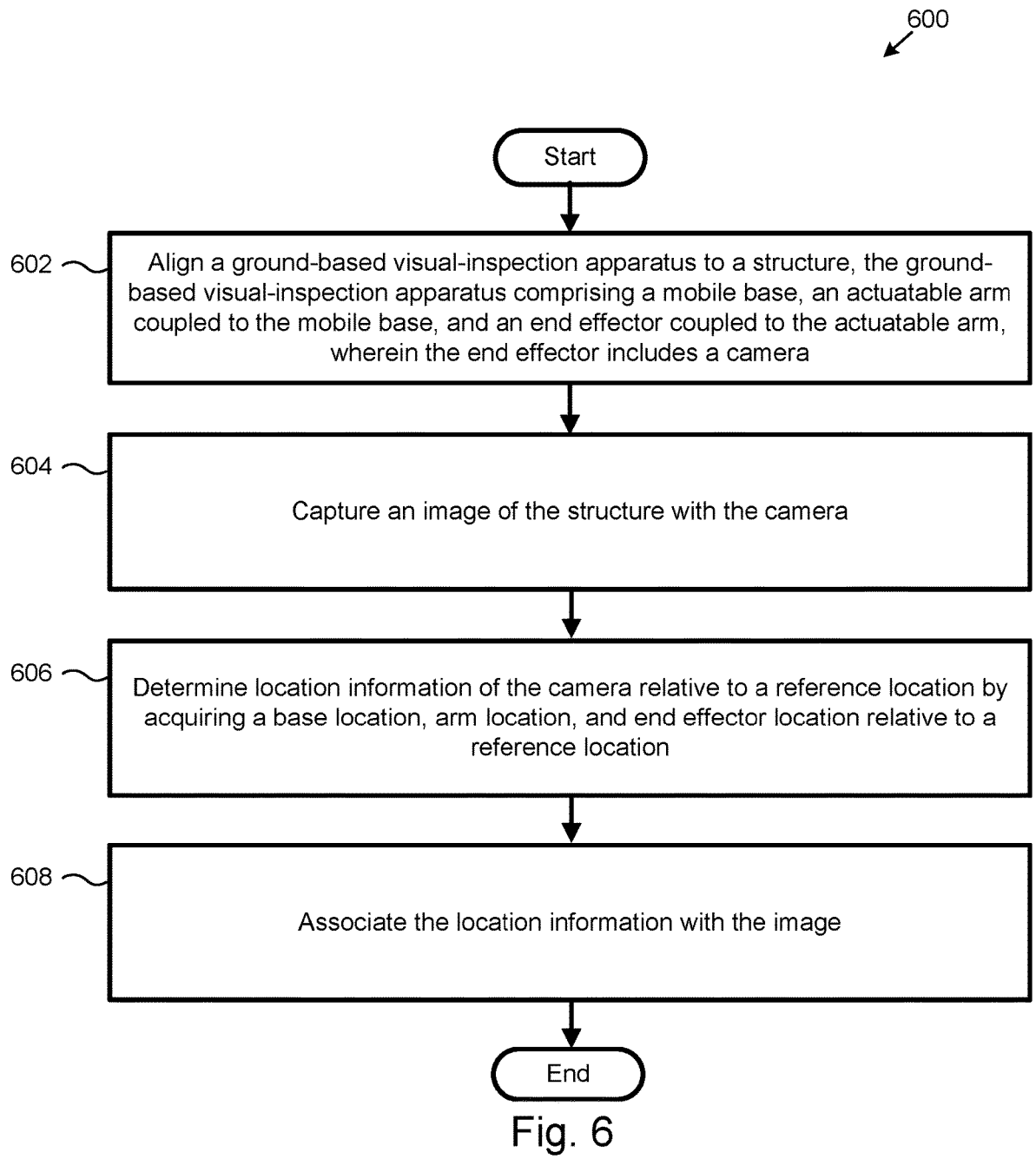
FIG. 6 is a schematic flow diagram of a method, according to one or more embodiments of the present disclosure.

Now referring to FIG. 6, one embodiment of a method 600 is shown. The method 600 includes aligning 602 a ground-based visual-inspection apparatus to an aircraft, the ground-based visual-inspection apparatus comprising a mobile base, an actuatable arm coupled to the mobile base, and an end effector coupled to the actuatable arm, wherein the end effector comprises a camera. The method 600 includes capturing 604 an image of the aircraft with the camera. The method 600 includes determining location information of the camera relative to a reference location by acquiring a base location, arm location, and end effector location relative to a reference location. The method 600 includes associating 608 location information with the image. The method then ends.

In some embodiments, the method 600 may further include embedding the location information into the image.

In certain embodiments, the method 600 may further include acquiring a base location by computing a transformation matrix of the mobile base 102 relative to the reference location. In some embodiments, the method 600 may further include acquiring an arm location by computing a transformation matrix of the actuatable arm relative to the reference location. In various embodiments, the method may further include performing matrix multiplication of the transformation matrix of the mobile base and the transformation matrix of the actuatable arm to compute a transformation matrix of the end effector relative to the reference location.

In some embodiments, the method may include determining distance information of the camera relative to the aircraft and associating the distance information with the image. In certain embodiments, the method may include determining orientation information of the camera relative to the aircraft and associating the orientation information with the image.

Although described in a depicted order, the method may proceed in any of a number of ordered combinations.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The control system, which may include associated modules and/or electronic controllers, described in this specification may be implemented as a hardware circuit comprising custom VLSI circuits or gate arrays, off-the-shelf semiconductors such as logic chips, transistors, or other discrete components. The control system may also be implemented in programmable hardware devices such as field programmable gate arrays, programmable array logic, programmable logic devices or the like.

The control system may also be implemented in code and/or software for execution by various types of processors. An identified module of code may, for instance, comprise one or more physical or logical blocks of executable code which may, for instance, be organized as an object, procedure, or function. Nevertheless, the executables of the electronic controller need not be physically located together, but may comprise disparate instructions stored in different locations which, when joined logically together, comprise the electronic controller and achieve the stated purpose for the electronic controller.

Indeed, code of the electronic controller may be a single instruction, or many instructions, and may even be distributed over several different code segments, among different programs, and across several memory devices. Similarly, operational data may be identified and illustrated herein within the electronic controller, and may be embodied in any suitable form and organized within any suitable type of data structure. The operational data may be collected as a single data set, or may be distributed over different locations including over different computer readable storage devices. Where the electronic controller or portions of the electronic controller are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the embodiments may be combined in any suitable manner. In the above description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A ground-based visual-inspection system for inspecting a structure, the ground-based visual-inspection system comprising:
   a ground-based visual-inspection apparatus comprising:
      a mobile base that translationally moves relative to a reference position to define a translational displacement of the mobile base;
      an actuatable arm coupled to the mobile base, the actuatable arm locatable in a three-dimensional space; and
      an end effector coupled to the actuatable arm, the end effector comprising:
         a set of at least three laser rangefinders; and
         a camera, wherein the camera is oriented relative to the structure in response to input from the set of at least three rangefinders, wherein a perpendicular distance between the structure and the camera is measured by the rangefinders, wherein a rotational orientation of the camera is determined relative to the reference position of the mobile base, and wherein the camera is configured to capture a set of visual images of a surface of the structure; and
   a control system that embeds the perpendicular distance to the surface of the structure within the set of visual images captured by the camera, the control system comprising:
      an alignment system comprising the set of at least three laser rangefinders spaced around a perimeter of the camera; and
      a feedback system configured to:
         utilize the set of at least three laser rangefinders to measure the perpendicular distance and the rotational orientation of the camera relative to each target area located on the surface of the structure without using optical targets, wherein the camera and the set of at least three laser rangefinders are non-movably fixed, relative to each other, and the end effector rotates the set of at least three laser rangefinders relative to the structure and moves the camera toward or away from the structure until the set of at least three laser rangefinders measures the same perpendicular distance to the surface of the structure;
         utilize the feedback system to, while translationally moving the camera along the surface of the structure:
            automatically adjust the perpendicular distance and the rotational orientation of the camera to maintain the set of at least three laser rangefinders at the same perpendicular distance from the surface of the structure and to maintain the rotational orientation of the camera perpendicular to the surface of the structure being captured by the set of visual images as the ground-based visual-inspection apparatus translationally moves the end effector relative to the reference position; and continuously adjust the alignment of the camera to maintain the perpendicular alignment of the camera relative to each target area located on the surface of the structure as the mobile base moves along the ground beside the structure and the actuatable arm moves in three-dimensions relative to the surface of the structure during inspection of the structure, determine location information of the camera in three-dimensions relative to a reference location, and associate the three-dimensional location information of the camera with location information for each respective target area located on the surface of the structure captured by the set of visual images as the mobile base moves along the ground beside the structure and the actuatable arm moves in three-dimensions relative to the surface of the structure during the inspection of the structure.

2. The ground-based visual-inspection system according to claim 1, wherein the control system is further configured to determine the location information by determining a location of the camera relative to the reference location by:

acquiring a base location by computing a transformation matrix of the mobile base relative to the reference location;

acquiring an arm location by computing a transformation matrix of the actuatable arm relative to the reference location; and performing matrix multiplication of the transformation matrix of the mobile base and the transformation matrix of the actuatable arm to compute a transformation matrix of the end effector relative to the reference location.

3. The ground-based visual-inspection system according to claim 1, wherein the control system is further configured to embed orientation information of the camera in the set of visual images.

4. The ground-based visual-inspection system according to claim 1, wherein the control system is configured to embed the location information into the set of visual images.

5. The ground-based visual-inspection system according to claim 4, wherein the location information is based on data from sensors on the ground-based visual-inspection apparatus or the structure.

6. The ground-based visual-inspection system according to claim 1, wherein the location information is based on the reference location on the structure.

7. The ground-based visual-inspection system according to claim 1, wherein the mobile base comprises a cart maneuverable by manual power.

8. The ground-based visual-inspection system according to claim 1, wherein:

the control system is further configured to embed orientation information within the set of visual images; and
the control system is further configured to embed the location information into the set of visual images.

9. The ground-based visual-inspection system according to claim 8, wherein the location information comprises the translational displacement from the reference position and rotational displacement from a reference orientation of the mobile base relative to the reference location.

10. The ground-based visual-inspection system according to claim 1, wherein the actuatable arm comprises an indexing rail.

11. A method comprising:

aligning a ground-based visual-inspection apparatus to a structure, the ground-based visual-inspection apparatus comprising a mobile base that translates relative to a reference position, an actuatable arm coupled to the mobile base, and an end effector coupled to the actuatable arm, wherein the end effector comprises a camera oriented relative to a structure wherein a perpendicular distance between the camera and the structure is measured by an alignment system comprising a set of at least three laser rangefinders spaced around a perimeter of the camera;

measuring, via the set of at least three laser range finders, a perpendicular distance between the camera and the structure and an orientation of the camera relative to each target area located on a surface of the structure without using optical targets;

automatically adjusting the set of at least three laser rangefinders so that they each measure the same perpendicular distance from the surface of the structure to the camera and adjusting an orientation of the camera that is perpendicular to the surface of the structure being captured by the set of visual images as the ground-based visual-inspection apparatus changes position;

continuously adjusting the alignment of the camera to maintain the perpendicular alignment of the camera relative to each target area located on the surface of the structure as the mobile base moves along the ground beside the structure and the actuatable arm moves in three-dimensions relative to the surface of the structure during inspection of the structure;

capturing a set of visual images of each target area on the surface of the structure with the camera; wherein the perpendicular distance between the camera and the surface of the structure is embedded in the set of visual images;

determining location information of the camera in three-dimensions relative to a reference location by acquiring a base location, arm location, and end effector location relative to a reference location; and associating the three-dimensional location information of the camera with location information for each respective target area located on the surface of the structure captured by the set of visual images as the mobile base moves along the ground beside the structure and the actuatable arm moves in three-dimensions relative to the surface of the structure during the inspection of the structure.

12. The method according to claim 11, further comprising receiving data from sensors and automatically adjusting the orientation or distance of the camera relative to the structure based on the received data.

13. The method according to claim 11, further comprising:

acquiring the base location by computing a transformation matrix of the mobile base relative to the reference location;

acquiring the arm location by computing a transformation matrix of the actuatable arm relative to the reference location; and performing matrix multiplication of the transformation matrix of the mobile base and the transformation matrix of the actuatable arm to compute a transformation matrix of the end effector relative to the reference location.

14. The method according to claim 11, further comprising:
determining distance information and orientation information of the camera relative to the structure; and
associating the distance information and the orientation information with the set of visual images.

15. The ground-based visual-inspection system according to claim 1, wherein two laser rangefinders in the set of at least three laser rangefinders are located on opposite sides of the camera.

16. The ground-based visual-inspection system according to claim 1, wherein the control system is further configured to embed orientation information within the set of visual images.

17. The ground-based visual-inspection system according to claim 1, wherein the control system is further configured to embed the location information within the set of visual images.

18. The ground-based visual-inspection system according to claim 1, wherein two laser rangefinders in the set of at least three laser rangefinders are located on a same side of the camera and one laser rangefinder in the set of at least three laser rangefinders is located on a side of the camera opposite that of the two laser rangefinders in the set of at least three laser rangefinders.

19. The ground-based visual-inspection system according to claim 1, wherein the surface of the structure is curved and translationally moving the camera along the surface comprises moving the camera along a curved path that complements a curvature of the surface of the structure.

20. The ground-based visual-inspection system according to claim 1, wherein the camera is rotatable relative to the actuatable arm.

* * * * *